(12) United States Patent
Shin et al.

(10) Patent No.: US 12,126,632 B2
(45) Date of Patent: Oct. 22, 2024

(54) PROTOCOL STATE FUZZING METHOD AND SYSTEM FOR SECURITY OF DISTRIBUTED SOFTWARE-DEFINED NETWORK CONTROL PLANE

(71) Applicant: Korea Advanced Institute of Science and Technology, Daejeon (KR)

(72) Inventors: Seungwon Shin, Daejeon (KR); Jinwoo Kim, Daejeon (KR); Minjae Seo, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 385 days.

(21) Appl. No.: 17/558,980

(22) Filed: Dec. 22, 2021

(65) Prior Publication Data
US 2023/0044281 A1  Feb. 9, 2023

(30) Foreign Application Priority Data

Jul. 21, 2021 (KR) .................. 10-2021-0095912
Dec. 22, 2021 (KR) .................. 10-2021-0184576

(51) Int. Cl.
*H04L 9/40* (2022.01)
*G06F 9/448* (2018.01)
(Continued)

(52) U.S. Cl.
CPC ........ *H04L 63/1416* (2013.01); *G06F 9/4498* (2018.02); *G06F 18/214* (2023.01);
(Continued)

(58) Field of Classification Search
CPC ............... H04L 63/1416; H04L 41/024; H04L 63/1425; H04L 63/1433; H04L 63/1408;
(Continued)

(56) References Cited

U.S. PATENT DOCUMENTS 8,417,993 B2 * 4/2013 O'Leary ................. G06F 21/57
714/25
9,917,924 B2 * 3/2018 Mandal ................... H04L 69/02
(Continued)

FOREIGN PATENT DOCUMENTS

KR  20210088242 A  7/2021

OTHER PUBLICATIONS

Moon et al., "Alembic: Automated Model Inference for Stateful Network Functions," Proc. 16th USENIX Symposium on Networked Systems Design and Implementation (NSDI'19), Feb. 26-28, 2019, Boston, MA, pp. 699-718 (2019), 21 pages.

*Primary Examiner* — Carl G Colin
*Assistant Examiner* — Andrew Suh
(74) *Attorney, Agent, or Firm* — ArentFox Schiff LLP; Joseph M. Maraia; Marlo Schepper Grolnic

(57) ABSTRACT

A protocol state fuzzing method for security of a control plane of a distributed software-defined network is provided. The protocol state fuzzing method includes receiving input alphabets being abstract symbols of a protocol message in an ambusher of a distributed network operating system (NOS), converting the input alphabets into the protocol message, and sending the protocol message to a cluster, monitoring, by the cluster, intercommunication between instances in the distributed NOS, and selecting a set of sequences executable in the cluster and searching a cluster log for an output by executing the sequence to generate an attack result.

15 Claims, 10 Drawing Sheets

(51) Int. Cl.
  *G06F 18/214* (2023.01)
  *H04L 41/02* (2022.01)
(52) U.S. Cl.
  CPC ........ *H04L 41/024* (2013.01); *H04L 63/1425* (2013.01); *H04L 63/1433* (2013.01)
(58) Field of Classification Search
  CPC ...... H04L 43/026; H04L 43/50; H04W 12/12; H04W 12/037; G06F 9/4498; G06F 18/214
  See application file for complete search history.

(56) References Cited

U.S. PATENT DOCUMENTS

| | | | |
|---|---|---|---|
| 10,713,151 B1* | 7/2020 | Zinger | G06F 11/3684 |
| 2013/0097134 A1* | 4/2013 | Thompson | G06F 16/81 |
| | | | 707/765 |
| 2013/0343181 A1* | 12/2013 | Stroud | H04L 69/22 |
| | | | 370/392 |
| 2015/0350235 A1* | 12/2015 | Kim | G06F 21/577 |
| | | | 726/25 |
| 2018/0152477 A1* | 5/2018 | Kakumaru | H04L 63/10 |
| 2021/0165641 A1* | 6/2021 | Gilpin | G06F 11/3684 |

* cited by examiner

PROTOCOL STATE FUZZING METHOD AND SYSTEM FOR SECURITY OF DISTRIBUTED SOFTWARE-DEFINED NETWORK CONTROL PLANE

CROSS-REFERENCE TO RELATED APPLICATIONS

A claim for priority under 35 U.S.C. § 119 is made to Korean Patent Application No. 10-2021-0095912 filed on Jul. 21, 2021, and Korean Patent Application No. 10-2021-0184576 filed on Dec. 22, 2021, in the Korean Intellectual Property Office, the entire contents of which are hereby incorporated by reference.

BACKGROUND

Embodiments of the inventive concept described herein relate to a protocol state fuzzing method for security of a control plane of a distributed software-defined network and a system therefor, and more particularly, relate to a method and a system for passively and actively monitoring intercommunication between instances in network operating systems (NOSs) and generating a possible attack scenario for distributed NOSs to automatically infer operation states of the distributed NOSs.

The software-defined network (SDN) has received considerable interest from academia and industry. The SDN is currently used in data centers and communication and enterprise environments. The SDN paradigm supports separating network intelligence (or a control plane) from a data transfer function of a network device (or a data plane) and placing the network intelligence on a centralized SDN controller (or a network operating system (NOS)). Such a controller may perform expansion through an SDN application (or an application plane). In general, this facilitates communication between planes using standard application programming interfaces (APIs) known as northbound and southbound interfaces. By means of this architecture, the SDN provides network operators with significant benefits such as centralized network control and management and an improved network programming function.

In the early days of the SDN paradigm, it is expected that the SDN controller will be a single point of failure capable of causing serious problems in terms of safety, security (e.g., a denial of service attack), latency, or scalability. However, East and West interfaces for supporting communication between controllers other than the northbound interface and the southbound interface are included in the SDN paradigm. It is common for network operators to develop control plane functions in the network depending on a SDN controller cluster (i.e., one main controller and multiple replicas) using these interfaces. Thus, when a fault occurs or will occur in the default SDN controller, the replica may be replaced immediately, leading to a more robust network. Likewise, to reduce latency and increase scalability, network operators often divide large networks into various subnetworks and manage each network by means of a different SDN controller. In this case, the SDN controllers may be far apart from each other to form a so-called software-defined wide area network (SD-WAN). Two representative examples of SD-WAN are used to interconnect globally distributed data centers (refer to FIG. 1), with the main goal being to achieve consistent network link utilization.

The SDN causes new security challenges and attack vectors, despite its significant benefits. Several researchers have demonstrated that adversaries are able to launch attacks against applications, control planes, and data planes. Among the attacks proposed so far, the attack targeting the controller is most dangerous. In other words, the controller is the brain of the network.

Although there are widespread attacks against the SDN controller, these attacks only consider a network with a single controller and are initiated through the southbound or northbound interface. However, the security of the protocols used on the East and West interfaces for SDN controller clusters to communicate with each other has not yet been investigated. Because the East-West protocol is used to perform important functions within a controller cluster, for example, selecting a leader SDN controller, selecting a controller for controlling each networking device, and applying network policies, security is very important for the correct operation of the network. When an attacker discovers and exploits a vulnerability from one of the East-West protocols, he or she may control a cluster of controllers and may launch a number of attacks to disrupt the network, obtain important network information, or damage the state of the network. The results of such an attack may be much greater than that of an attack executed against a single SDN controller. For example, in the case of the SD-WAN, enemies located in one subnetwork may perform remote attacks on other subnetworks far away from them.

Thus, the security threats and risks of SDN networks using several controllers remain unexamined. In this regard, thoroughly examining the security issues of the East-West interface is an important issue for operators to establish a reliable cluster. There are several test tools which are adjusted to suit SDN environments, but they are not suitable for the distributed SDN. An up-to-date distributed NOS includes a variety of East and West protocols, so traditional tools need a significant time to discover vulnerabilities in complex scenarios. Furthermore, unlike the SDN southbound interface (i.e., OpenFlow), there is no standard specification for the East-West protocol. Thus, it is difficult to plan test tools because the protocol operation is likely to be heterogeneous for different NOSs. As a result, a black box fuzzer does not work unless it learns to implement the protocol properly.

To address the above-mentioned problems, embodiments of the inventive concept are to design and implement an ambusher for performing protocol state fuzzing for a distributed NOS environment. The protocol state fuzzing is known as an effective fuzzing method which facilitates exploration of many system states to find abnormal cases.

SUMMARY

Embodiments of the inventive concept provide an ambusher which is a test tool for passively and actively monitoring intercommunication between NOS instances and generating a possible attack scenario for distributed NOSs to automatically infer operation states of the distributed NOSs.

According to an exemplary embodiment, a protocol state fuzzing method for security of a control plane of a distributed software-defined network may include receiving input alphabets being abstract symbols of a protocol message in an ambusher of a distributed network operating system (NOS), converting the input alphabets into the protocol message, and sending the protocol message to a cluster, monitoring, by the cluster, intercommunication between instances in the distributed NOS, and selecting a set of sequences executable in the cluster and searching a cluster log for an output by executing the sequence to generate an attack result.

The transmitting of the protocol message to the cluster may include receiving the input alphabets, generating a query to deliver the query to a proxy, converting the query into the protocol message, and sending the protocol message to a target cluster by a dummy arbiter generated in the cluster, and sending a response message to a learner to output a message identical to the response message, when the proxy searches for the response message.

The receiving may include receiving the input alphabets indicating the abstract symbols of the protocol message to send the input alphabets to a system under learning (SUL) such that the SUL observes output alphabets for the input alphabets.

The proxy may convert the input alphabets into the protocol message and may use a user-defined protocol for protocol implementation.

The monitoring of the intercommunication may include repeating a loop of transmitting the protocol message to the cluster, until generating an inferred state machine.

The generating of the attack result may include systematically generating a test case using the state machine.

The generating of the attack result may include exploring the state machine to select the set of sequences executable in a cluster environment, deleting an alphabet which does not affect a state transition from the state machine to execute a message sequence generable in the state machine, and searching the cluster log for the output to generate the attack result.

The generating of the attack result may include generating a set of cluster message sequences such that the target cluster transitions to as many states as possible.

The generating of the attack result may include using state depth-first search (SDFS) of extracting a message sequence.

According to an exemplary embodiment, a protocol state fuzzing method for security of a control plane of a distributed software-defined network may include receiving input alphabets being abstract symbols of a protocol message in an ambusher of a distributed network operating system (NOS), converting, by a proxy, the input alphabets into the protocol message and sending, by a dummy arbiter generated in a cluster, the protocol message to a target cluster, sending a response message to a learner to output a message identical to the response message, when the proxy searches for the response message, repeating a loop of the receiving, the sending of the protocol message to the target cluster, and the sending of the response message to the learner to generate an inferred state machine, exploring the state machine to select a set of sequences executable in a cluster environment, and deleting an alphabet which does not affect a state transition from the state machine to execute a message sequence generable in the state machine, and searching a cluster log for an output by executing the sequence to generate an attack result.

According to an exemplary embodiment, a protocol state fuzzing system for security of a control plane of a distributed software-defined network may include a processing unit that receives input alphabets being abstract symbols of a protocol message in an ambusher of a distributed network operating system (NOS), converts the input alphabets into the protocol message, and sends the protocol message to a cluster, a management unit that monitors intercommunication between instances in the distributed NOS in the cluster, and a result output unit that selects a set of sequences executable in the cluster and searches a cluster log for an output by executing the sequence to generate an attack result.

The processing unit may include a reception unit that receives the input alphabets and a transmission unit that generates a query to deliver the query to a proxy, converts the query into the protocol message, and sends the protocol message to a target cluster by a dummy arbiter generated in the cluster. The transmission unit may send a response message to a learner to output a message identical to the response message, when the proxy searches for the response.

The reception unit may receive the input alphabets indicating the abstract symbols of the protocol message to send the input alphabets to a system under learning (SUL) such that the SUL observes output alphabets for the input alphabets.

The transmission unit may convert the input alphabets into the protocol message and may use a user-defined protocol for protocol implementation in the proxy.

The management unit may repeat a loop of the processing unit, until generating an inferred state machine.

The result output unit may explore the state machine to select the set of sequences executable in a cluster environment, may delete an alphabet which does not affect a state transition from the state machine to execute a message sequence generable in the state machine, and may search the cluster log for the output to generate the attack result.

The result output unit may generate a set of cluster message sequences such that the target cluster transitions to as many states as possible.

The result output unit may use state depth-first search (SDFS) of extracting a message sequence.

According to an exemplary embodiment, a protocol state fuzzing system for security of a control plane of a distributed software-defined network may include a state machine builder that receives input alphabets being abstract symbols of a protocol message from distributed network operating systems (NOSs), converts the input alphabets into the protocol message, sends the protocol message to a target cluster by a dummy arbiter generated in a cluster, and generates an inferred state machine, a state machine fuzzer that explores the state machine to select a set of sequences executable in a cluster environment, deletes an alphabet which does not affect a state transition from the state machine to execute a message sequence generable in the state machine, search a cluster log for an output by executing the sequence to generate an attack result, and a cluster environment manager that manages clusters.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
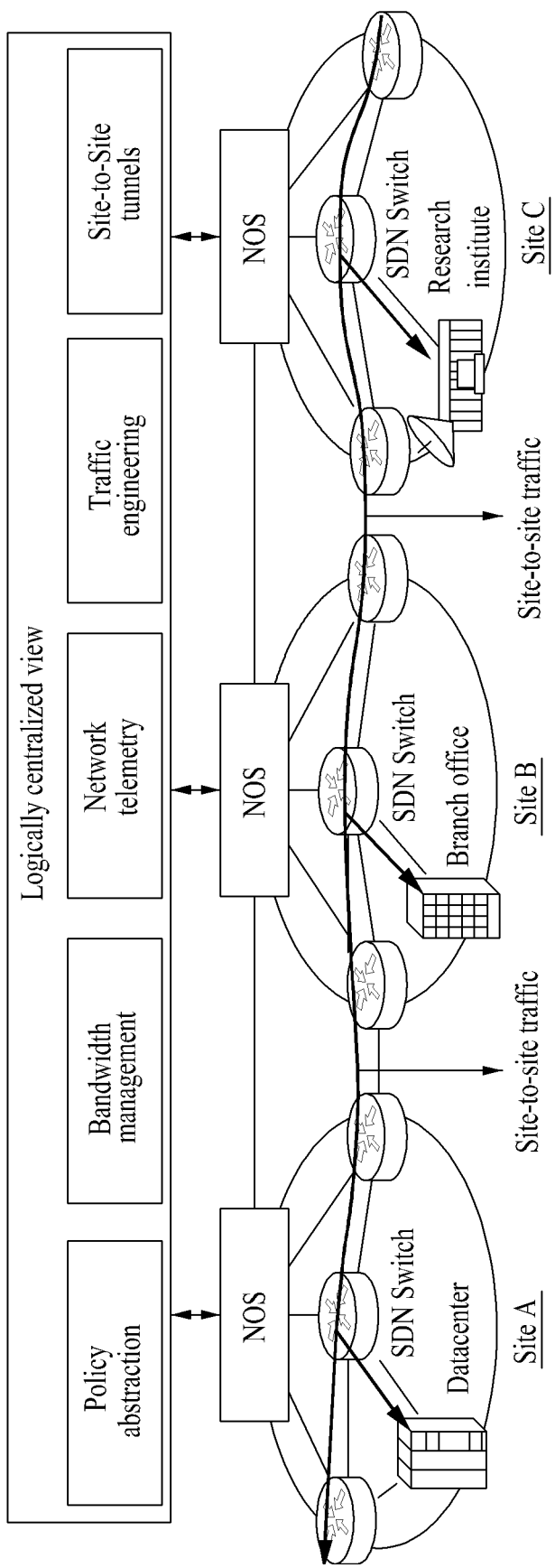
FIG. 1 illustrates distributed NOSs distributed for constructing an SD-WAN.

Advantages, features, and methods of accomplishing the same in the inventive concept will become apparent with reference to embodiments described in detail below together with the accompanying drawings. However, the inventive concept is not limited by embodiments disclosed hereinafter, and may be implemented in various forms. Rather, these embodiments are provided so that this disclosure will be through and complete and will fully convey the concept of the invention to those skilled in the art, and the inventive concept will only be defined by the scope of the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of stated components, steps, operations, and/or elements, but do not exclude presence or addition of one or more other components, steps, operations, and/or elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, exemplary embodiments of the inventive concept will be described in detail with reference to the accompanying drawings. The same reference denotations are used for the same components on the drawings, and a duplicated description of the same components will be omitted.

Embodiments of the inventive concept may be the subject matter of designing, implementing, and proposing an ambusher for inferring a hidden state and analyzing security of a distributed SDN cluster.

A distributed network operating system (NOS) is in the spotlight as an essential part of a wide area network (WAN) for efficient network management. However, a distributed architecture of the NOS has brought a new attack surface and has not received attention so far. Thus, to address these concerns, an embodiment of the inventive concept proposes an ambusher which is a test tool capable of passively/actively monitoring intercommunication between NOS instances and generating a possible attack scenario for a distributed NOS to automatically infer an operation state of the distributed NOS. To this end, the architecture and operating scenarios of the distributed NOS may be investigated. This becomes the design philosophy of the ambusher. This is intended to recognize an inner operation of the distributed NOS and to reveal vulnerabilities capable of occurring therein. Furthermore, the ambusher is evaluated by geographically constructing a real SD-WAN composed of two campus networks and one enterprise network. The ambusher has been shown to be able to discover potential vulnerabilities in a common distributed NOS platform.

Hereinafter, an embodiment of the inventive concept will be described in detail with reference to FIGS. 2 to 10.

Figure 2:
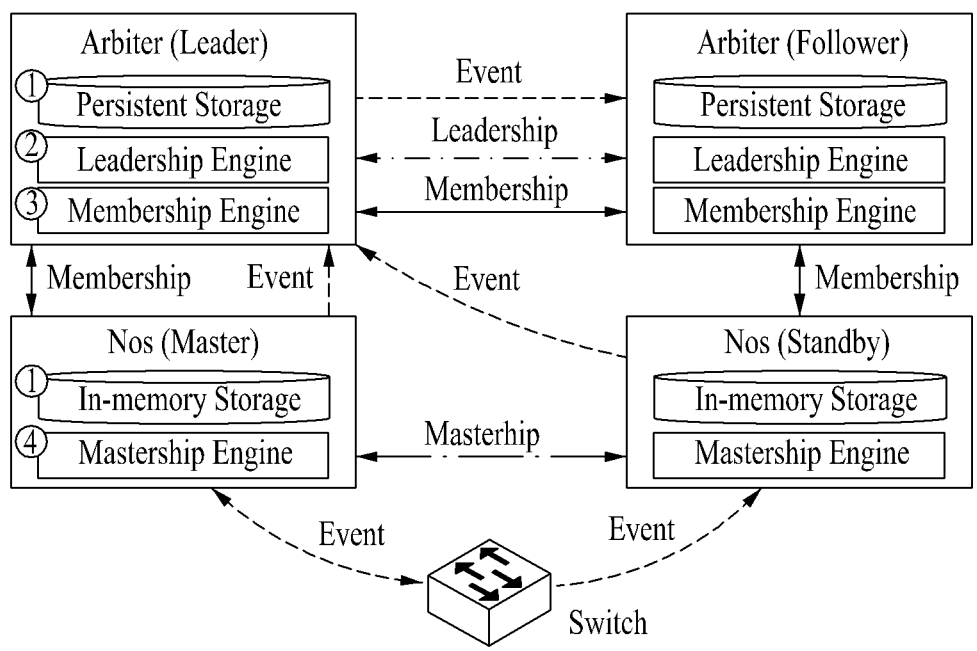
FIG. 2 illustrates a structure of distributed NOSs.
Figure 3:
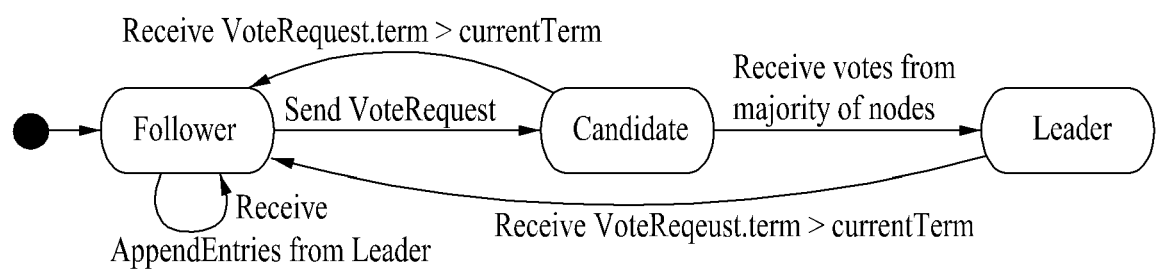
FIG. 3 illustrates a state machine of a Raft consensus protocol.
Figure 4:
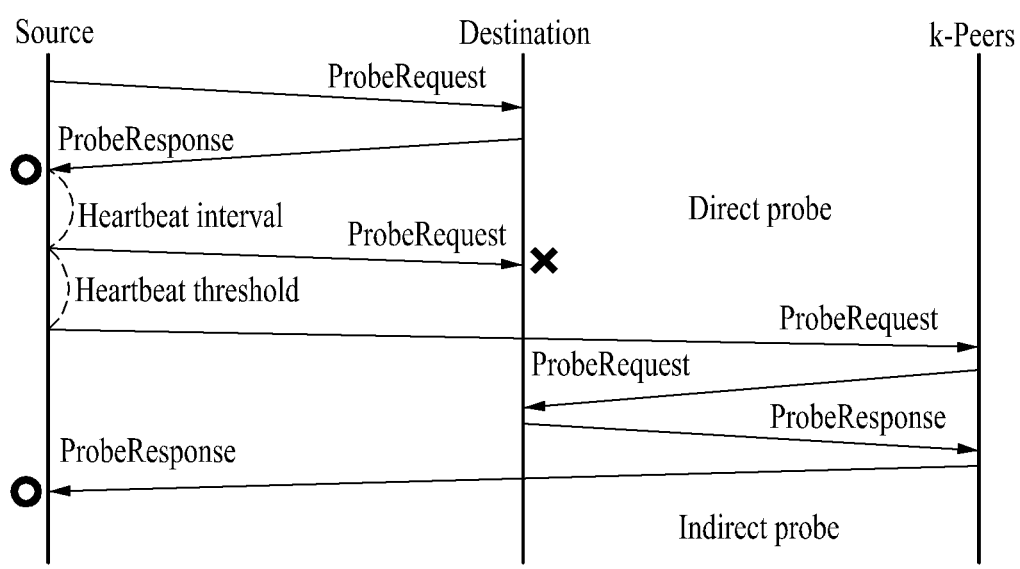
FIG. 4 illustrates a sequence diagram of a SWIM protocol.

FIG. 2 illustrates a structure of distributed NOSs. FIG. 3 illustrates a state machine of a Raft consensus protocol. FIG. 4 illustrates a sequence diagram of a SWIM protocol.

Hereinafter, a description will be given of the background necessary to understand an architecture of the distributed NOS with reference to FIGS. 2 to 4.

Referring to FIG. 2, the distributed NOS may be composed of at least one or more controllers which communicate with each other to accomplish a logically centralized control plane. Each of all the distributed NOSs may be composed of four main components, for example, (1) distributed storage for managing a global network state, (2) a leadership engine for selecting a leader, (3) a membership engine for periodically checking the life of a node, and (4) a mastership engine for determining ownership of network device management (e.g., switches). To reduce a load of the NOS, some of previous functions may be implemented in a separate node called an arbiter. Thus, a set of the arbiter and the NOS node may form a so-called controller cluster. Hereinafter, a description will be given of how each of the four components operates.

Distributed Storage

One of the important aspects of the distributed NOS is to achieve a consistent view between distributed storage and distributed storage. To this end, the node should synchronize the storage with another node after a new event is generated. The synchronization methodology is defined by a consistency policy which varies with a type of a target event. For example, because an event of a control plane such as leadership/mastership is associated with a cluster work, it should be immediately updated. In this case, such an event should be ensured by strong consistency. On the other hand, because an event of a data plane generated by a network device is managed by a master controller, it is not necessary to be strictly updated. Thus, such an event may be loosely synchronized through ultimate consistency.

Leadership Engine

Because event synchronization requires the role of designating a node to adjust the synchronization work, selecting a leader node is a basic task for a distributed NOS cluster. The leader should receive all network states from another follower node and should track a recent state of each storage. A node for selecting the leader performs a series of selection processes. Nodes compete with each other to be elected as the leader in the leader election process, and a node which does not become the leader becomes a follower. Next, such a follower node serves as a backup to receive a replicated state from the leader node.

Raft is the most well-known algorithm used for leader election. Simplicity thereof may allow the widely used distributed NOS to place Raft dominantly. Seeing the operation of Raft with reference to FIG. 3, the node initially starts in a follower state to set any timer. When the timer expires, the node may send a RaftVoteRequest message to a peer node to become a leader. Thereafter, the node may switch to a candidate state, while waiting for a response. When receiving votes from most cluster nodes, the node may be promoted to a leader state. Otherwise, the corresponding state may change to the follower state again. This selection cycle is recorded as the selection period to count the number of repeated selection tasks during the selection period. When receiving a new RaftVoteRequest message including a higher term than an old leader from the leader node, because the cluster regards the old leader as being invalid, the cluster may be in a follower state and restarts an election procedure for electing a new leader.

Membership Engine

Another key component for preventing a Byzantine fault in the distributed system posts a node about the state of another node. To this end, the node may periodically examine the life of a peer and may send a heartbeat message to all nodes to perform a so-called membership test. Broadcasting is widely used to propagate the heartbeat, but is not suitable for a large cluster. Alternatively, a SWIM protocol may be used. This is an advanced investigation solution to address the limitations. The basic concept of SWIM is that the node selectively pings only one node at a time such that large numbers of heartbeat messages are not generated. Taking FIG. 4 as an example, when a source wants to investigate a target node, the node may first and directly send a SwimProbeRequest to a target. When a SwimProbeResponse is not reached within a specific heartbeat threshold, the source may request t peer members to indirectly investigate the target.

Mastership Engine

Mastership represents a user who has the authority to control a network device. When a large number of devices are maintained on the network, it is important to divide a management sector into a suitable number of segments in conjunction with the overall performance improvement. When the NOS node fetches a master for a specific switch, the node manages a delivery rule of a switch through a southbound protocol such as OpenFlow. The master node has the write permission capable of correcting the rule, whereas another NOS node (i.e., a standby node) may only read the rule. When a fault occurs in the master node, the mastership moves to one of standby nodes.

Figure 5:
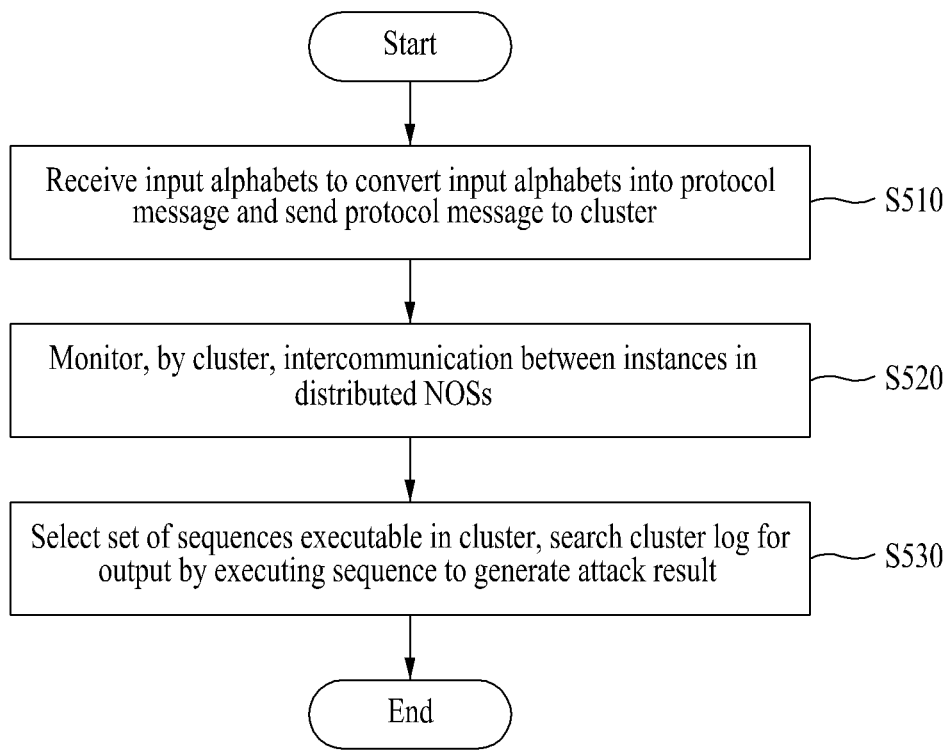
FIG. 5 illustrates an operational flowchart of a protocol state fuzzing method according to an embodiment of the inventive concept.
Figure 6:
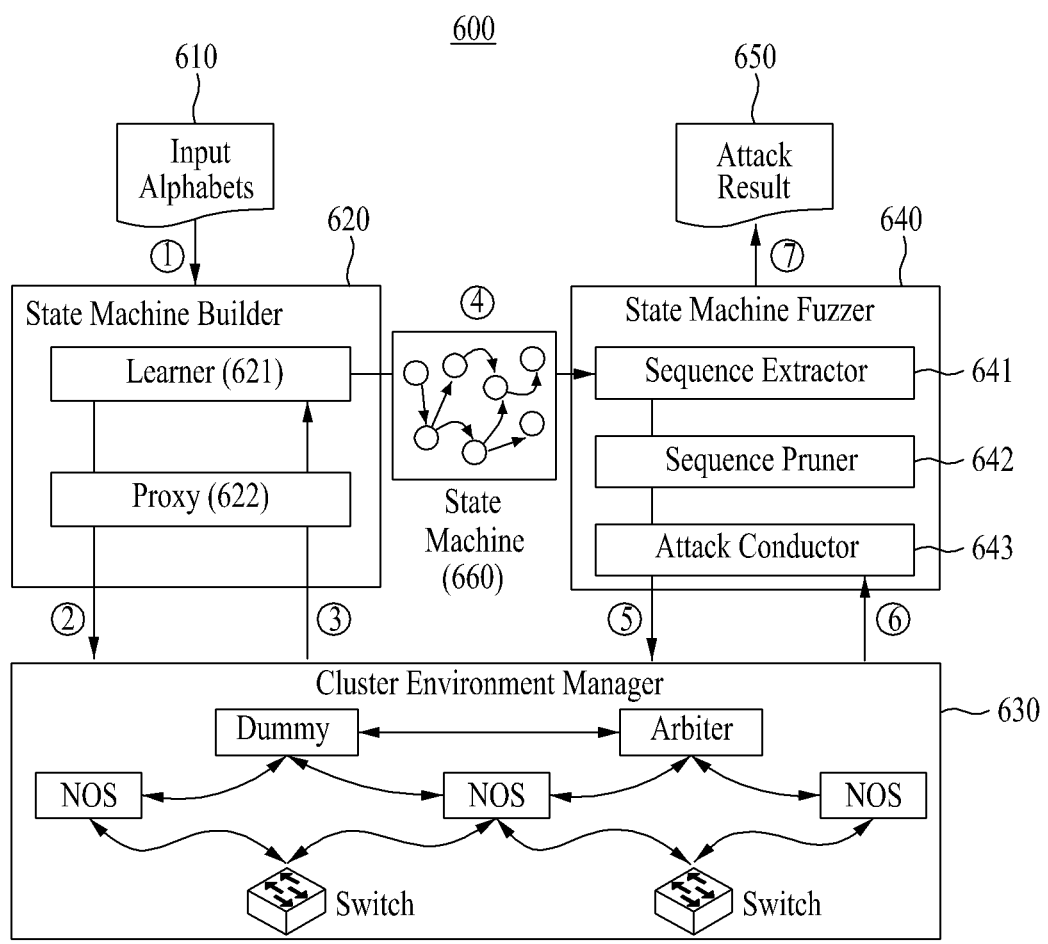
FIG. 6 illustrates a structure and an operational flow of an ambusher according to an embodiment of the inventive concept.

FIG. 5 illustrates an operational flowchart of a protocol state fuzzing method according to an embodiment of the inventive concept. FIG. 6 illustrates a structure and an operational flow of an ambusher according to an embodiment of the inventive concept.

Referring to FIG. 6, an ambusher 600 according to an embodiment of the inventive concept may be composed of three main modules such as a state machine builder 620, a state machine fuzzer 640, and a cluster environment manager 630.

A detailed operation will be described with reference to FIGS. 5 and 6. In operation S510, input alphabets 610 may be received to be converted into a protocol message and the protocol message may be sent to a cluster.

Operation S510 may include receiving (①) the input alphabets which are abstract symbols of the protocol message from a network operator in an ambusher of a distributed NOS. In the receiving (①), the input alphabets indicating the abstract symbols of the protocol message may be received to be transmitted to a system under learning (SUL). The SUL may observe output alphabets for the input alphabets.

Thereafter, in operation S510, a learner 621 may generate a query used in a learning state and may deliver the generated query to a proxy 622. Thereafter, operation S510 may include converting (②) the query into a detailed protocol message and sending the protocol message to a target cluster by a dummy arbiter generated in the cluster. In the sending, the proxy 622 may convert the input alphabets into the protocol message and may use a user-defined protocol for protocol implementation.

Thereafter, in operation S510, when searching (③) the cluster for a response message, the proxy 622 may send the message to the learner 621 to learn the output identical to the message.

In operation S520, the cluster may monitor intercommunication between instances in the distributed NOSs.

In operation S520, the learner 621 may repeat the loop of operation S510 when generating (④) an inferred state machine 660.

In operation S530, a set of sequence executable in the cluster may be selected to search a cluster log for an output by executing the sequence and generate an attack result 650. In operation S530, a test case may be systematically generated using the state machine.

In detail, in operation S530, a sequence extractor 641 of the state machine fuzzer 640 may explore the state machine 660 and may select (⑤) an executable state sequence set capable of being allowed in the cluster environment. At this time, after a sequence pruner 642 removes an unnecessary input which does not affect a state transition, an attack conductor 643 may execute the sequence and may search (⑥) the cluster log for the output. Finally, the state machine fuzzer 640 may generate (⑦) the attack result 650. This may then be manually analyzed to find attacks by several criteria.

In operation S530, a set of cluster message sequences may be generated such that the target cluster transitions to as many states as possible. Furthermore, in operation S530, state depth-first search (SDFS) of extracting a message sequence may be used.

Figure 7:
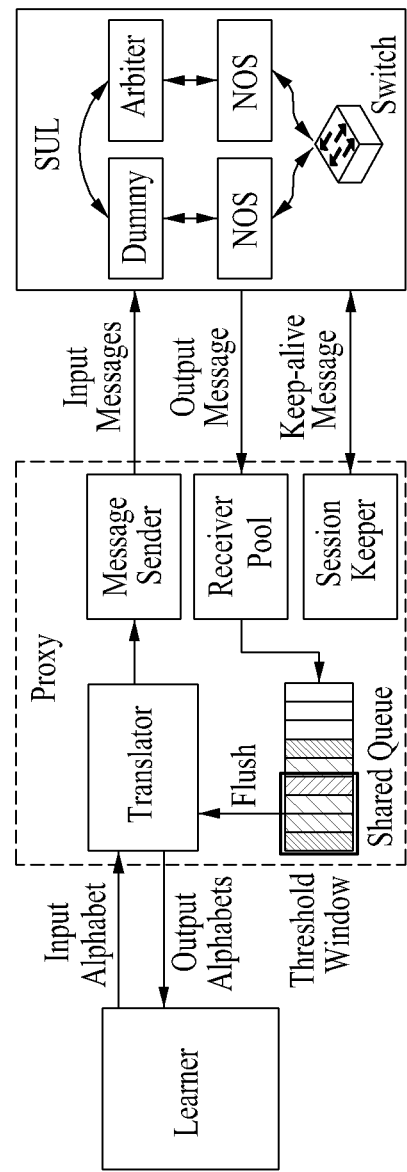
FIG. 7 illustrates a state machine builder according to an embodiment of the inventive concept.
Figure 8:
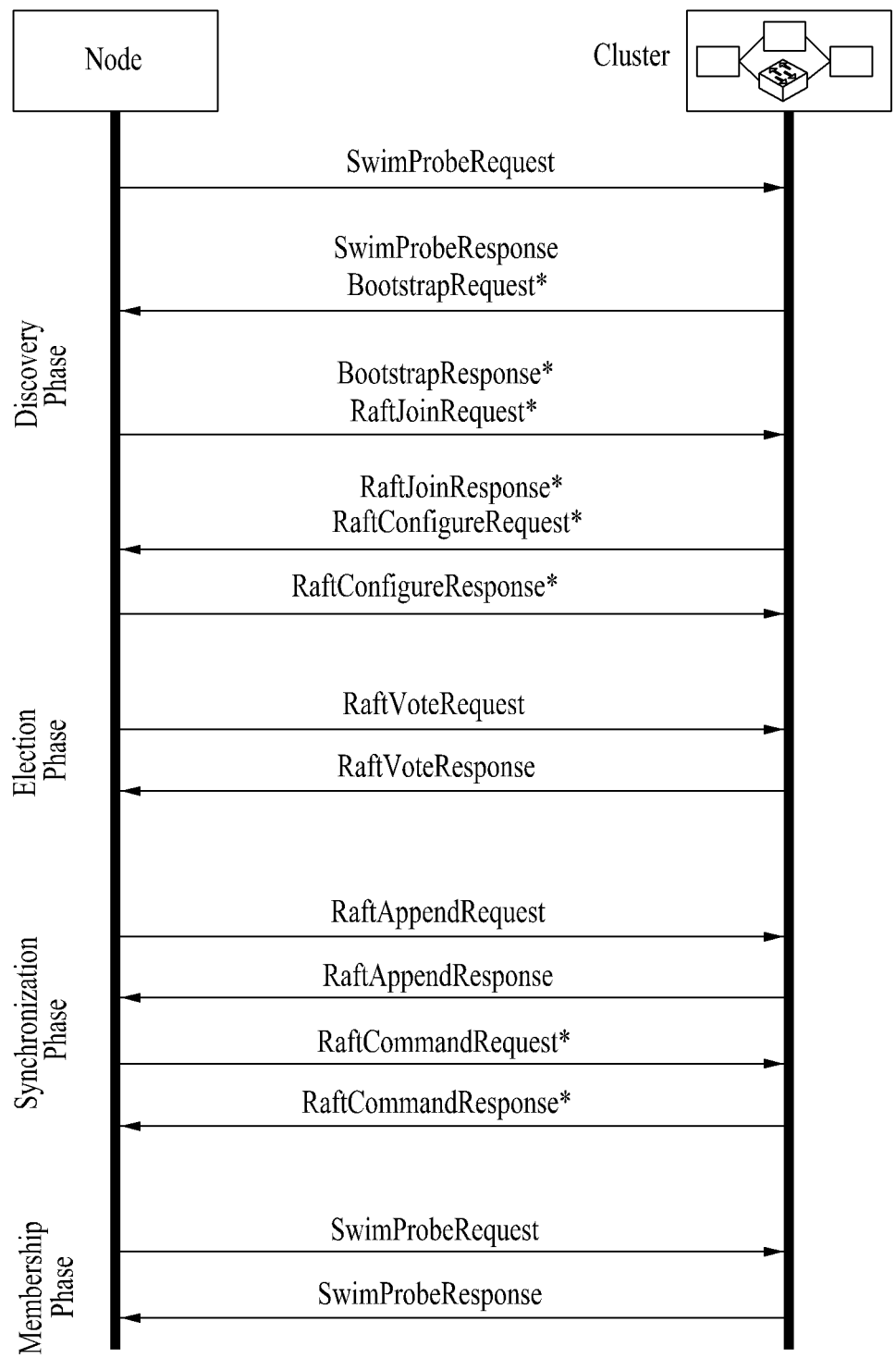
FIG. 8 illustrates an interaction between a dummy node and an ONOS/Atomix cluster according to an embodiment of the inventive concept.
Figure 9:
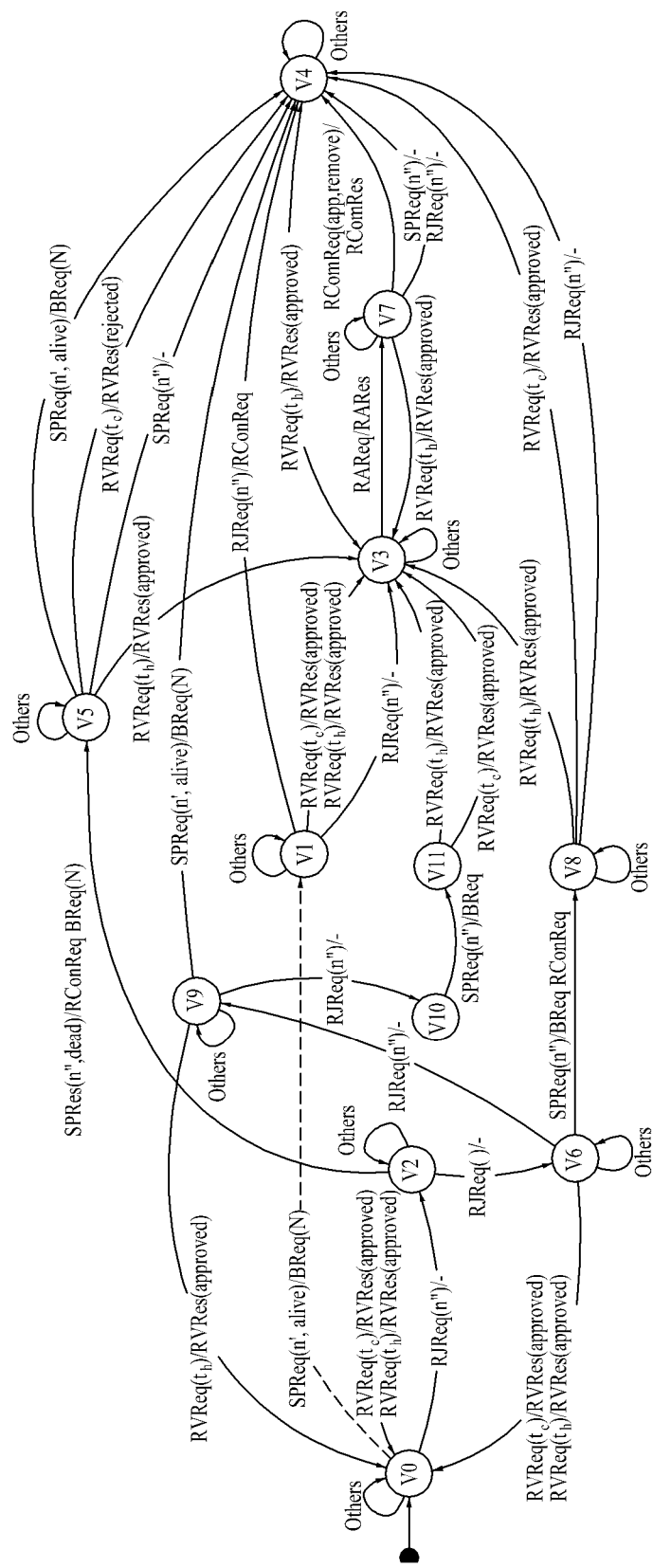
FIG. 9 illustrates an automatically configured Mealy machine of an ONOS/Atomix cluster according to an embodiment of the inventive concept.

FIG. 7 illustrates a state machine builder according to an embodiment of the inventive concept. FIG. 8 illustrates an interaction between a dummy node and an ONOS/Atomix cluster according to an embodiment of the inventive concept. FIG. 9 illustrates an automatically configured Mealy machine of an ONOS/Atomix cluster according to an embodiment of the inventive concept.

Hereinafter, a description will be given in detail of details of a learning technique for inferring an internal state of a distributed NOS cluster.

Learning State Machine

Automata learning is a framework for systematically inferring a finite state machine (FSM) of a target system. Among many FSMs, because a Mealy machine is very suitable for understanding a protocol operation due to its deterministic properties, it is mainly used for protocol state fuzzing. State transition is determined by a unique input and a unique state. Herein, when the state machine is the FSM, the output of which is determined by a current state and a current input, it invokes the Mealy machine. The framework is composed of two main concepts such as (i) a learner and (ii) a system under learning (SUL) to form a series of learning procedures.

The learner is responsible for inferring the Mealy machine (in this case, the target cluster environment) of a given SUL. The learner repeats a search stage and a test stage during a learning process. In the search stage, a series of predetermined symbols (i.e., input alphabets) are sent to the SUL to observe a response (i.e., output alphabets) of the SUL. When an appropriate number of responses are observed, the learner creates a hypothesis model. This model is a minimum Mealy machine, the state of which complies with observation. The hypothesis model verifies whether there is a counterexample which violates the model to perform verification in the test stage. When nothing is found, the hypothetical model is accepted. Otherwise, the model is embodied. This series of challenges is repeated until no opposite case is able to be found in the model.

At this time, because the input alphabets are not a real protocol message, they are abstract symbols that SUL does not basically understand. To this end, there is a need for an intermediate proxy which interprets the input alphabets into a specific message. On the other hand, the protocol of the distributed NOS generally has a keep-alive message. When a new node joins the cluster, old members periodically send such keep-alive messages to the node. It is inevitable to respond to the message to maintain a valid East-West session with the SUL, but the message due to unity should just be learned. Furthermore, the protocol sends/receives the message using a separate session, and communication is executed in parallel between nodes. Considering this simultaneous execution, it is difficult to determine which output is deterministically derived from which input.

As shown in FIG. 7, an embodiment of the inventive concept designs a proxy to integrate the above-mentioned considerations. When receiving input text, a translator converts a symbol into a protocol message. Because there is currently no standard for an East-West protocol, most distributed NOSs use a user-defined protocol for protocol implementation. Thus, when a target NOS uses an expanded message exceeding a general protocol description, such conversion needs analysis of a source code. The specific message is sent by a message sender connected with a dummy node of the SUL. When a new channel is established with the SUL, a receiver pool dynamically invokes the generation of a new thread. Shared queues are used to process messages transmitted simultaneously. When a sender delivers a message to the SUL, a thread in the receiver pool queues the received message to a shared queue, and then the translator queues the message within the threshold window (using the same threshold as a heartbeat threshold of a cluster configuration). The message sender maintains a logical clock and generates a timestamp when sending the input message. By verifying this clock, the translator ensures an accurate message order. A session keeper is used to respond to a keep-alive message to maintain the East-West channel, but the received message is not used for learning. Proxy utilization plays an important role in fill a difference between the learner and the SUL at the same time as converting the symbol into the protocol message.

In addition, to prevent complex state learning in a distributed environment, it is preceded by understanding a cluster operation from a holistic perspective. In general, because the cluster is managed by the leader, the leader node responds to most messages. Indeed, an embodiment of the inventive concept devises an abstract model showing an integrated interaction in terms of a node-cluster relationship rather than communication for each protocol. FIG. 8 illustrates a message interaction generated when a dummy node starts to communicate with a target cluster from scratch. An embodiment of the inventive concept analyzes an ONOS controller by means of a representative SDN cluster implementing the above-mentioned distributed architecture/protocol. Hereinafter, a description will be given of four interaction phases including brief descriptions of protocol messages.

1) Discovery Phase

It aims to search a target cluster and join it as a legitimate member in the discovery phase. Initially, this node sends a SwimProbeRequest and then triggers the cluster to respond to a SwimProbeResponse and a BootstrapRequest. The latter includes configuration information such as a cluster member/protocol. This node sends a BootstrapResponse designating architecture information (e.g., a protocol and a node) together and also sends a RaftJoinRequest for participating in the cluster to a Raft member. Thereafter, the cluster responds to a RaftJoinResponse and a RaftConfigureRequest for sending current Raft protocol information (e.g., a period and a leader).

2) Election Phase

The message of the election phase is associated with a leader election process of most Raft protocols. When joining the cluster, the role of the node is basically assigned to a follower. A node has its own election timer. When the timer expires, it attempts to promote to the leader by sending a RaftVoteRequest message to the cluster. When receiving a RaftVoteResponse message that most nodes agree with, the node becomes the leader.

3) Synchronization Phase

The node which joins in the cluster starts to synchronize an event. When receiving a RaftAppendRequest including a commit message promoted by the leader, the node will recognize that the request is received and the commit message is executed and will send a RaftAppendResponse. The node is able to read and correct a shared view (e.g., an application or a topology) of distributed storage using the RaftCommandRequest, and the cluster notifies the result using the RaftCommandResponse.

4) Membership Phase

The node periodically verifies the lifetime of a peer node based on a membership protocol. When a SWIM protocol is used, the node randomly selects a target node, sends a SwimProbeRequest designating an identifier to the cluster, and receives a SwimProbeResponse message.

An embodiment of the inventive concept defines alphabets used for state machine learning, as summarized in Table 1 below, based on a message exchange model.

TABLE 1

| | Alphabet | Shorthand |
|---|---|---|
| Membership | SwimProbeRequest(n) <br> n ∈ {n', n''} n' ∈ N, n'' ∉ N | SPReq(n) |
| | SwimProbeResponse(n, s) <br> n ∈ N, s ∈ {alive,dead} | SPRes(n, s) |
| Discovery | BootstrapRequest(N') <br> N' ⊆ N | BReq(N') |
| | BootstrapResponse(N') <br> N' ⊆ N | BRes(N') |
| | RaftJoinRequest(n) <br> n ∈ {n', n''} n' ∈ N, n'' ∉ N | RJReq(n) |
| | RaftJoinResponse | RJRes |
| | RaftConfigureRequest | RConReq |
| | RaftConfigureResponse | RConRes |

TABLE 1-continued

| Alphabet | | Shorthand |
|---|---|---|
| Election | RaftVoteRequest(n, t) | RVReq(n, t) |
| | n ∈ N, t ∈ {$t_h$, $t_c$} $t_h$ > $t_c$ | |
| | RaftVoteResponse(v) | RVRes(v) |
| | v ∈ {approved, rejected} | |
| Synchronization | RaftCommandRequest(d, o) | RComReq(p, o) |
| | d ∈ {app, topo}, o ∈ {add, modify remove} | |
| | RaftCommandResponse | RComRes |
| | RaftAppendRequest | RAReq |
| | RaftAppendResponse | RARes |
| | NoResponse | — |

An embodiment of the inventive concept extracts and selects a message parameter which is able to influence the internal state of the cluster to generate a state machine including various cases. For example, SwimProbeResponse (n, s) implies that the node is in membership state s. This may be active or inactive to respond to SwimProbeRequest (n). BootstrapRequest(N') and BootstrapResponse(N') indicate that there is a node currently configured in the cluster. The variable N' may be a subset of the entire node set N. RaftJoinRequest(n) indicates that node n participates in Raft protocol interaction, which is later answered by RaftJoin-Response. The variable n may be a current member node n' or a new node n". RaftConfigureRequest(n) indicates that the node joins the Raft cluster and responds to the RaftConfigureResponse. RaftVote Request(n, t) means that node n is trying to promote to the leader with term t which may be greater term th or current term tc. The RraftVote Response (v) is used to notify of voting results capable of being approved or rejected. RaftCommandRequest(d, o) instructs the cluster to run operation o capable of adding, correcting, or removing shared data, which may be important information such as application, topology, or mastership information (respectively indicated as app and topo). Variations of these parameters within a specific range may switch the cluster to an abnormal state.

State Machine Fuzzing

An embodiment of the inventive concept proposes a fuzzy technique for systematically generating a test case using a state machine. To this end, this phase aims to generate a set of cluster message sequences such that the target cluster transitions to as many states as possible.

To this end, to perform fuzzing using the assembled Mealy machine, it should first be formulated into an appropriate structure. The Mealy machine may be represented as a Multi-edged graph $\mathcal{G} = (\mathcal{V}, \mathcal{E})$. Herein, V denotes the state and c denotes the transition labeled with input alphabet I and output alphabet O. I and O are functions of mapping the transition to message m.

An embodiment of the inventive concept deletes an alphabet which does not affect the transition in the state machine to reduce the effort to analyze the state. For example, there may be a loop where the state is connected with the state machine in the state machine. Furthermore, there is a keep-alive message which only activates meaningful transitions, such as SwimProbeRequest and RaftAppendRequest. Such a transition is excluded from the set of candidate message sequences and is indicated as "Others" in the state diagram (refer to FIG. 9).

In addition, an embodiment of the inventive concept explores all reachable states and generates a sequence of messages capable of being generated in the state machine. To this end, an embodiment of the inventive concept proposes an algorithm, such as Algorithm 1 below, which extracts a message sequence using the DFS.

ALGORITHM 1

DFS for Message Sequence Extraction

Require:
    A Mealy machine graph $\mathcal{G} = (\mathcal{V}, \varepsilon, I, O)$,
    An initial state $v_0$
Ensure:
    A set of message sequences S
1: procedure INIT($\mathcal{G}, v_0$)
2:    $\mathcal{M} \leftarrow ( )$    ▷ Empty set
3:    $S \leftarrow [ ]$    ▷ Empty list
4:    Set all states in $\mathcal{G}$ as not visited
5:    At SDFS($\mathcal{G}, v_0, \mathcal{M}, S$)
6:    return $\mathcal{M}$
Require:
    A currently visited state v,
    A subsequence that consists of states visited previously S'
7: procedure SDFS($\mathcal{G}, v_0, \mathcal{M}, S_{pre}$)
8:    for e ∈ $\mathcal{G}$.outgoingEdges(v), where e = (v, w) do
9:      if w is not visited then
10:        Mark w as visited
11:        m ← I(e)   ▷ Get a message from a transition
12:        $S_{pre}$.append(m)   ▷ Add the message to the sequence
13:        $\mathcal{M} \leftarrow \mathcal{M} \cup S_{pre}$   ▷ Add the subsequence to the set
14:        $S_{post} \leftarrow$ SDFS($\mathcal{G}, w, \mathcal{M}, S_{pre}$)   ▷ Call SDFS recursively
15:        $\mathcal{M} \leftarrow \mathcal{M} \cup S_{post}$   ▷ Add the subsequence to the set
16:    return $\mathcal{M}$ State depth-first search (SDFS) uses a Mealy machine graph $\mathcal{G}$ and an initial state $v_0$ as inputs and generates a message sequence M as an output. The SDFS initializes two variables M and S (rows 1-3). The former is the output of the algorithm and finally becomes the final set of message sequences. The latter is used to store messages extracted from the states visited so far. Initially, the algorithm marks all states as unvisited and starts traversing from the initial state $v_0$ (rows 4-5). When invoked, the SDFS finds all outgoing edges (i.e. transitions) from the current state v and verifies whether the next state (rows 7-9) is visited. Otherwise, the algorithm displays the state after the visit and fetches message m from transition e (rows 10-11). The message is added to a Spre sequence and is also added to a set M (rows 12-13). The SDFS is repeatedly called using a next state w and a pre-sequence Spre, and then generates a post-sequence Spost (row 14). Finally, a message M including both pre- and post-sequences is generated (row 16).

Figure 10:
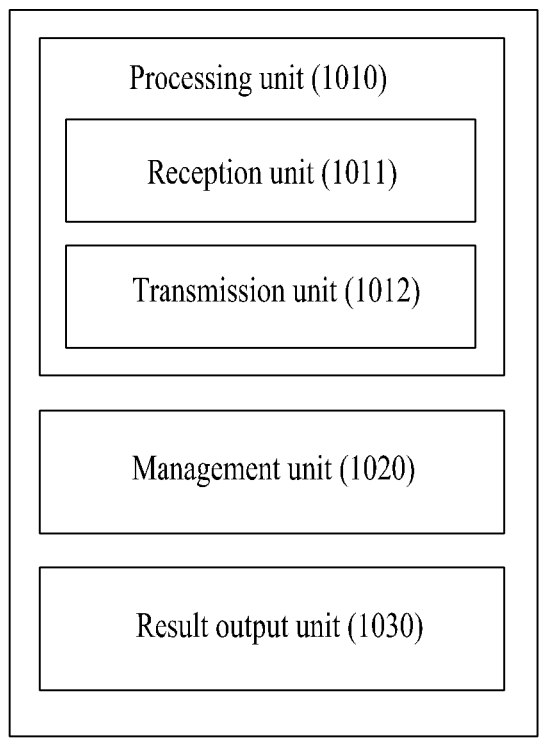
FIG. 10 is a block diagram illustrating a detailed configuration of a protocol state fuzzing system according to an embodiment of the inventive concept.

FIG. 10 is a block diagram illustrating a detailed configuration of a protocol state fuzzing system according to an embodiment of the inventive concept, which illustrates a conceptual configuration of a system for performing the method of FIGS. 5 to 9.

Referring to FIG. 10, a protocol state fuzzing system 1000 according to an embodiment of the inventive concept may include a processing unit 1010, a management unit 1020, and a result output unit 1030. Furthermore, the processing unit 1010 may include a reception unit 1011 and a transmission unit 1012.

The processing unit 1010 may receive input alphabets to convert the input alphabets into a protocol message and may send the protocol message to a cluster.

The processing unit 1010 may include the reception unit 1011 which receives the input alphabets, which are abstract symbols of the protocol message, from a network operator in an ambusher of a distributed NOS. The reception unit 1011 may receive the input alphabets indicating the abstract symbols of the protocol message to send the input alphabets to a system under learning (SUL), such that the SUL may observe output alphabets for the input alphabets.

Thereafter, a learner may generate a query used in a learning state and may deliver the generated query to a proxy. Thereafter, the query may be converted into a detailed protocol message. The transmission unit 1012 may send the protocol message to a target cluster by a dummy arbiter generated in the cluster. In this case, the transmission unit 1012 may convert the input alphabets into the protocol message and may use a user-defined protocol for protocol implementation in the proxy.

Thereafter, when the proxy searches the cluster for a response message, the processing unit 1010 may send a message to the learner to learn an output identical to the message.

The management unit 1020 may monitor intercommunication between instances in NOSs distributed in the cluster.

The management unit 1020 may repeat a loop of the processing unit 1010, until the learner generates an inferred state machine.

The result output unit 1030 may select a set of sequences executable in the cluster and may search a cluster log for an output by executing the sequence to generate an attack result. The result output unit 1030 may systematically generate a test case using the state machine.

In detail, the result output unit 1030 may explore the state machine and may select an executable state sequence set capable of being allowed in the cluster environment. In this case, the result output unit 1030 may remove an unnecessary input which does not affect a state transition, may execute the sequence, and may search the cluster log for the output. Finally, the result output unit 1030 may generate an attack result.

Furthermore, the result output unit 1030 may generate a set of cluster message sequences such that a target cluster transitions to as many states as possible and may use state depth-first search (SDFS) of extracting a message sequence.

It is apparent to those skilled in the art that, although the description is omitted in the system of FIG. 10, the respective means making up FIG. 10 may include all contents described in FIGS. 1 to 9.

The foregoing systems or devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPGA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The computer-readable media may also include, alone or in combination with the program instructions, data files, data structures, and the like. The program instructions recorded in the media may be designed and configured specially for the exemplary embodiments of the inventive concept or be known and available to those skilled in computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

According to an embodiment of the inventive concept, the security of protocols used on East and West interfaces may be investigated, and protocol state fuzzing may reveal potentially hidden vulnerabilities in the West and East protocols of the distributed NOS.

In addition, according to an embodiment of the inventive concept, an ambusher for proposing a learning method capable of extracting a state machine from a distributed SDN cluster running several controllers and protocols, generating a message sequence leading the cluster to an unexpected state in the state machine, and performing state recognition fuzzing may be designed and implemented.

Furthermore, according to an embodiment of the inventive concept, the ambusher of a distributed SDN cluster built on the SD-WAN testbed may be evaluated, and a potential vulnerability in the ONOS, which is one of the most used SDN controllers, may be disclosed.

While a few embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A protocol state fuzzing method for security of a control plane of a distributed software-defined network, the protocol state fuzzing method comprising:
    receiving input alphabets being abstract symbols of a protocol message in an ambusher of a distributed network operating system (NOS), converting the input alphabets into the protocol message, and sending the protocol message to a cluster,
    wherein sending the protocol message to the cluster includes:
        receiving the input alphabets;
        generating a query to deliver the query to a proxy, converting the query into the protocol message, and sending the protocol message to a target cluster by a dummy arbiter generated in the cluster, wherein the proxy converts the input alphabets into the protocol message and uses a user-defined protocol for protocol implementation; and
        sending a response message to a learner to output a message identical to the response message when the proxy searches for the response message;
    monitoring, by the cluster, intercommunication between instances in the distributed NOS; and
    selecting a set of sequences executable in the cluster and searching a cluster log for an output by executing a sequence to generate an attack result.

2. The protocol state fuzzing method of claim 1, wherein the receiving input alphabets includes: receiving the input alphabets indicating the abstract symbols of the protocol message to send the input alphabets to a system under learning (SUL) such that the SUL observes output alphabets for the input alphabets.

3. The protocol state fuzzing method of claim 1, wherein the monitoring of the intercommunication includes:
    repeating a loop of transmitting the protocol message to the cluster, until generating an inferred state machine.

4. The protocol state fuzzing method of claim 3, wherein the generating of the attack result includes:
    systematically generating a test case using the state machine.

5. The protocol state fuzzing method of claim 4, wherein the generating of the attack result includes:
    exploring the state machine to select the set of sequences executable in a cluster environment, deleting an alphabet which does not affect a state transition from the state machine to execute a message sequence generable in the state machine, and searching the cluster log for the output to generate the attack result.

6. The protocol state fuzzing method of claim 5, wherein the generating of the attack result includes:
    generating the set of sequences executable in the cluster environment such that the target cluster transitions to as many states as possible.

7. The protocol state fuzzing method of claim 6, wherein the generating of the attack result includes:
    using state depth-first search (SDFS) of extracting a message sequence.

8. A protocol state fuzzing method for security of a control plane of a distributed software-defined network, the protocol state fuzzing method comprising:
    receiving input alphabets being abstract symbols of a protocol message in an ambusher of a distributed network operating system (NOS);
    converting, by a proxy, the input alphabets into the protocol message and sending, by a dummy arbiter generated in a cluster, the protocol message to a target cluster;
    sending a response message to a learner to output a message identical to the response message, when the proxy searches for the response message;
    repeating a loop of the receiving input alphabets, the sending of the protocol message to the target cluster, and the sending of the response message to the learner to generate an inferred state machine;
    exploring the state machine to select a set of sequences executable in a cluster environment, and deleting an alphabet which does not affect a state transition from the state machine to execute a message sequence generable in the state machine; and
    searching a cluster log for an output by executing the message sequence to generate an attack result.

9. A protocol state fuzzing system for security of a control plane of a distributed software-defined network, the protocol state fuzzing system comprising:
    at least one processor operatively connected to a memory;
    the processor configured to receive input alphabets being abstract symbols of a protocol message in an ambusher of a distributed network operating system (NOS), convert the input alphabets into the protocol message, and send the protocol message to a cluster,
    wherein the sending the protocol message to the cluster includes:
        receiving the input alphabets; and
        generating a query to deliver the query to a proxy, converting the query into the protocol message, and sending the protocol message to a target cluster by a dummy arbiter generated in the cluster, wherein the proxy converts the input alphabets into the protocol message and uses a user-defined protocol for protocol implementation, sending a response message to a learner to output a message identical to the response message, when the proxy searches for the response message;

monitoring, by the cluster, intercommunication between instances in the distributed NOS; and selecting, by the cluster, a set of sequences executable in the cluster and search a cluster log for an output by executing a sequence to generate an attack result.

10. The protocol state fuzzing system of claim 9 is further comprising, receiving the input alphabets indicates the abstract symbols of the protocol message to send the input alphabets to a system under learning (SUL) such that the SUL observes output alphabets for the input alphabets.

11. The protocol state fuzzing system of claim 9 is further comprising, monitoring repeats a loop of the receiving input alphabets, until generating an inferred state machine.

12. The protocol state fuzzing system of claim 11 is further comprising, selecting explores the state machine to select the set of sequences executable in a cluster environment, deleting an alphabet which does not affect a state transition from the state machine to execute a message sequence generable in the state machine, and searching the cluster log for the output to generate the attack result.

13. The protocol state fuzzing system of claim 12 is further comprising, generating a set of cluster message sequences such that the target cluster transitions to as many states as possible.

14. The protocol state fuzzing system of claim 13 is further comprising, using state depth-first search (SDFS) of extracting the message sequence.

15. A protocol state fuzzing system for security of a control plane of a distributed software-defined network, the protocol state fuzzing system comprising:

at least one processor operatively connected to a memory, the processor enabled for:

receiving input alphabets being abstract symbols of a protocol message from distributed network operating systems (NOSs), converting the input alphabets into the protocol message, sending the protocol message to a target cluster by a dummy arbiter generated in a cluster, and generate an inferred state machine;

exploring the inferred state machine to select a set of sequences executable in a cluster environment, deleting an alphabet which does not affect a state transition from the state machine to execute a message sequence generable in the inferred state machine, searching a cluster log for an output by executing the sequence to generate an attack result; and managing clusters.

* * * * *